Figure 1:
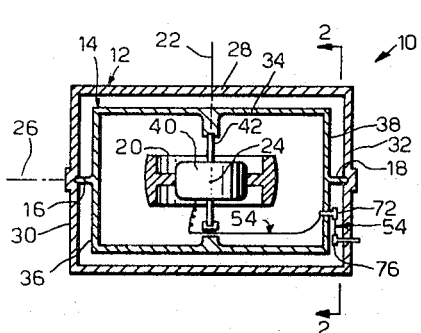

Nov. 21, 1967  R. J. COHEN ET AL  3,353,413

GYROSCOPE FLEXIBLE LEADS

Filed May 15, 1964

ROBERT J. COHEN
OSCAR M. EDELMAN
INVENTORS

BY

Thomas W. Kennedy
ATTORNEY

United States Patent Office 3,353,413
Patented Nov. 21, 1967

3,353,413
GYROSCOPE FLEXIBLE LEADS
Robert J. Cohen, Wyckoff, and Oscar M. Edelman, Nutley, N.J., assignors to General Precision Inc., Little Falls, N.J., a corporation of Delaware
Filed May 15, 1964, Ser. No. 367,778
7 Claims. (Cl. 74—5)

This invention relates to single-axis gyros, and particularly to single-axis gyros having an odd number of flexible leads extending from its float to its casing.

Conventional single-axis gyros have a casing, a float, a rotor and a motor with spring-like flex leads, which are fixedly connected at each end to terminals on the float wall and adjacent casing end wall. A problem with such gyros having an odd number of leads is that there is an unbalance in the spring restraint in a clockwise direction as compared to a counter-clockwise direction, and this causes drift errors in the gyro. A typical example is a gyro with a three-phase motor having three such leads. In an attempt to minimize the spring unbalance, the first lead can be arranged to oppose the second lead. But the spring unbalance of the odd lead cannot be avoided. In some gyros it is very desirable to eliminate even a slight drift error due to such spring unbalance from an odd lead.

In accordance with one embodiment of the present invention, a redundant lead is added to the gyro, and is disposed oppositely to the odd lead to balance its spring effect thereby substantially eliminating all spring unbalance from the gyro leads.

Accordingly, it is one object of the invention to eliminate any unbalance in the spring restraints of the flex leads for clockwise and counter-clockwise rotation in a single-axis gyro.

It is another object of the invention to minimize gyro drift error by balancing the spring restraints and by reducing the elastic restraint range about the null position of the gyro flex leads.

It is a further object of the invention to minimize current-induced thermal reactions at the flex lead connections.

Therefore, in order to fulfill the above objects, a flexible electrical conductor is provided, in accordance with the invention, for spanning between a float and casing of a single-axis gyro, the float having a null position relative to the casing and being rotatable relative to the casing on either side of the null position about the gyro axis. Such conductor comprises a first terminal disposed on the casing, a second terminal disposed on the float which is radially separated from the casing terminal and which is coplanar with the casing terminal and gyro axis when the float is in its null position. Said conductor also comprises a bent wire with respective end portions fixedly connected to said terminals, and having a clockwise spring rate and a different counter-clockwise spring rate urging the float towards its null position. Said conductor also comprises a spring means, which has respective end portions fixedly connected to said terminals, and which has a clockwise spring rate identical to the wire counter-clockwise rate, and which has a counter-clockwise spring rate which is identical to the wire clockwise rate. With this construction of the flexible electrical conductor, the total clockwise spring rate of the wire and spring in combination is identical to the total counter-clockwise spring rate of said wire and spring in combination.

Figure 2:
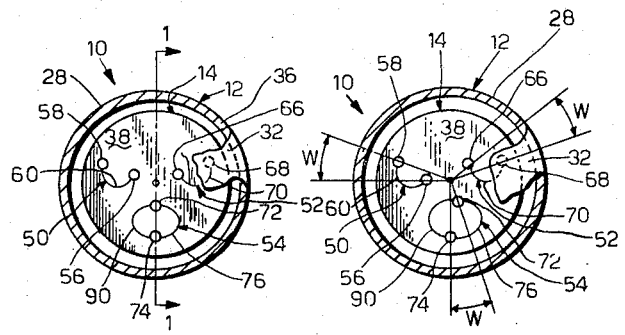
Figure 3:
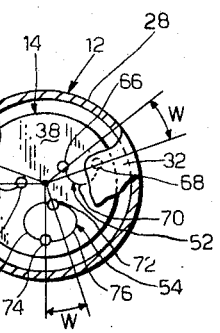
Figure 4:
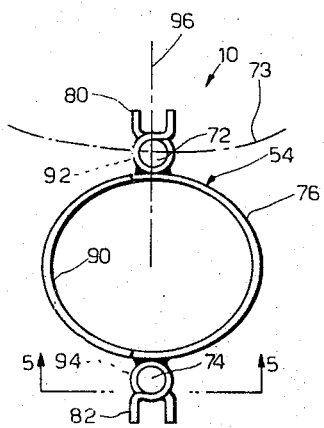
Figure 7:
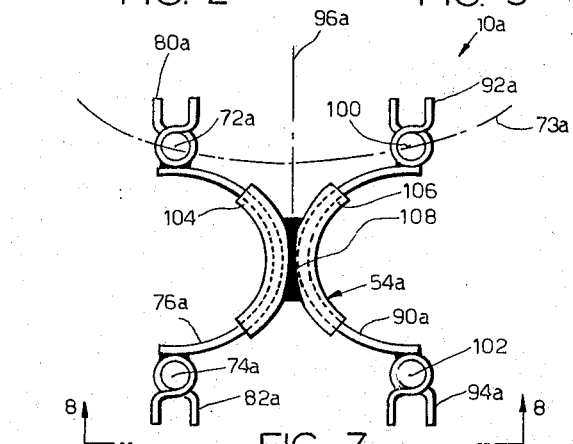
Figures 8, 9:
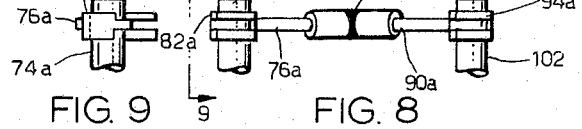
Figure 5:
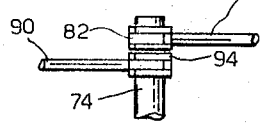
Figure 6:
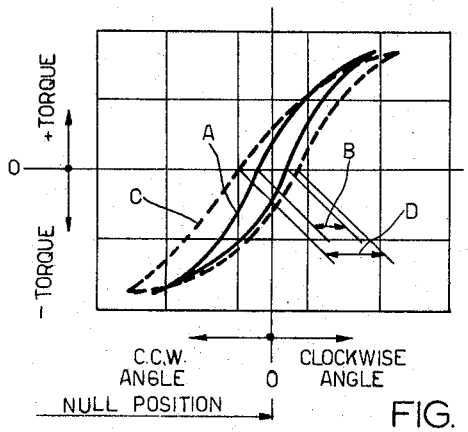

Other objects of the invention will become apparent upon reading the annexed detail description in connection with the drawings wherein like parts are designated by like numerals throughout the several views, and wherein:

FIG. 1 is a sectional view of a single-axis gyro embodying features of the present invention;
FIG. 2 is a sectional view on line 2—2 of FIG. 1;
FIG. 3 is another sectional view, similar to FIG. 2;
FIG. 4 is an enlarged detail of a portion of FIG. 2;
FIG. 5 is a sectional view on line 5—5 of FIG. 4;
FIG. 6 is a graph indicating the performance of the single-axis gyro embodying features of the present invention;
FIG. 7 is an enlarged detail of an alternate embodiment, similar to FIG. 4;
FIG. 8 is a sectional view on line 8—8 of FIG. 7; and
FIG. 9 is a sectional view on line 9—9 of FIG. 8.

Referring to FIGS. 1–5, one embodiment of the present invention, which is a single-axis, floated type of gyro 10, comprises a casing or outer gimbal 12, and a float or inner gimbal 14, which is supported from said casing by two pivots 16, 18, and which is preferably floated in damping fluid contained in said casing. Float 14 supports a rotor 20 having a rotor spin axis 22. Casing 12 has a gyro input axis 24, which is coplanar with spin axis 22, and has a gyro output axis 26, which is the axis of rotation of said float and said casing, and which axis 26 is substantially at right angles to the plane including spin axis 22 and axis 24.

Casing 12 has a peripheral wall 28 and a pair of axially spaced end walls 30, 32. Float 14 has a peripheral wall 34 and a pair of axially spaced end walls 36, 38, which are respectively adjacent to walls 30, 32. Rotor 20 (FIG. 1) is driven by and supported by a motor 40, which has an axle 42 that is supported at each end from wall 34. Motor 40 is preferably a three-phase type of motor having three conductors 50, 52, 54, which supply current from an external source (not shown).

Conductor 50 (FIG. 2) has a terminal pin 56, having one end fixedly connected to wall 38 and having an opposite end pointing axially outwardly toward wall 32; and has an adjacent terminal pin 58 disposed radially outwardly of pin 56 and having one end fixedly connected to wall 32 and having an opposite end pointing axially inwardly toward wall 38. Conductor 50 also has a flex lead 60 having one end fixedly connected to pin 56 and having its other end fixedly connected to pin 58. Pin 56 is connected to motor 40 by conventional means (not shown); and pin 58 is connected to an external power source by conventional means (not shown).

Conductor 52 (FIG. 2), which is similar in construction to conductor 50, also has a terminal pin 66 having one end fixedly connected to wall 38 and having an opposite end pointing axially outward toward wall 32; and has a terminal pin 68 having one end fixedly connected to wall 38 and having an opposite end pointing axially inwardly toward wall 38. Conductor 52 also has a flex lead 70 interconnecting pins 66 and 68. Flex lead 70 (FIG. 2) has its ends pointing substantially counter-clockwise and is oppositely disposed to flex lead 60, which has its ends pointing substantially clockwise.

Conductor 54 (FIGS. 1 and 2) has a terminal pin 72 fixedly connected to wall 38, and a terminal pin 74 fixedly connected to wall 32, and a flex lead 76 interconnecting pins 72 and 74. The aforementioned parts of conductor 54 are similar to the parts of the structure of conductors 50 and 52, respectively.

Pins 56, 66, 72 (FIG. 2) are disposed on wall 38, equidistant from axis 26 in a radial direction, and are equispaced angularly about axis 26 in a peripheral direction. Similarly, pins 58, 68, 74 are disposed on wall 32, equidistant from axis 26 in a radial direction, and are equispaced angularly about axis 26 in a peripheral direction. In addition, pins 56, 58 and 66, 68 and 72, 74 are respectively coplanar. Pins 72, 74 are illustrated in their null position in FIGS. 2 and 4. As shown in FIG. 4, pin 72 also has an arcuate path of travel indicated by center line 73. For comparison with FIG. 2, the float 14 in FIG. 3 is shown after being rotated counter-clockwise away from its null position, and having its pins 56, 66, 72, each rotated through an identical angle W.

Leads 60, 70, 76 are conventional strips, preferably in the form of preshaped, uninsulated, conductive, metal strips. Lead 76 (FIG. 4) has a pair of end-connection, electrical clips 80, 82, respectively connecting to pins 72, 74. Clips 80, 82 are respectively soldered to the opposite ends of lead 76, and support lead 76 from pins 72, 74. Clips 80, 82 also are made of conductive material to permit flow of current therethrough between pins 72, 74. Leads 60, 70, each have a pair of clips (not shown), respectively similar to clips 80, 82. Clips 80, 82, which have a spring-like eye-loop, are clamped over pins 72, 74, respectively and provide fixed-ended connections on their lead 76.

Conductor 54 (FIG. 2), according to the invention, also has a spring means 90 preferably in the form of a redundant flex lead (FIG. 4). Lead 90 has a clip 92, which is fixedly connected to pin 72 (FIG. 4), adjacent clip 80; and has at its opposite end a clip 94, which is fixedly connected to pin 74 (FIG. 5), adjacent clip 82. Lead 90 is preferably identical in construction to lead 76, and is arranged symmetrically about a radial axis of symmetry 96, when the float is in a null position (FIG. 4). The respective end clips 80, 92 and 82, 94, substantially point toward each other in this arrangement. Moreover, in this arrangement, lead 76 is disposed on one side of axis 96, and has a different spring rate in a clockwise rotation then in a counter-clockwise rotation by itself. In addition, in this arrangement, lead 90 is disposed opposite to lead 76, and has an equal spring rate. In this way, leads 76 and 90 in combination have a total spring rate which is substantially identical in a clockwise rotation as in a counterclockwise rotation from said null position. Thus, conductors 50, 52, 54 are able to avoid spring unbalance in their restraints on float 14.

In FIG. 6, test data of one sample of gyro 10 is plotted and shown in the symmetrical hysteresis curve A, which indicates that the spring restraints of the flex leads of gyro 10 are more nearly balanced on either side of its null position. Dimension B of curve A in FIG. 6 also shows the elastic restraint range of said sample of embodiment 10. This range is often used as a conventional standard to measure gyro sensitivity.

For comparison with curve A, a broader hysteresis curve C is plotted in FIG. 6, representing a prior-art, single-axis gyro. Dimension D of curve C shows the elastic restraint range of such prior-art gyro.

In practice, it is impossible to entirely eliminate the elastic restraint range B, due to the threshold frictions of the pivots, the threshold damping resistance of the damping fluid and due to a very small, residual, spring hysteresis effect. With the construction of embodiment 10, the elastic restraint range has been minimized by balancing the spring restraints of its leads. Thus, the elastic restraint range B is reduced, and the shifting of the mechanical null position is lessened over the prior-art gyros, whereby the drift error of gyro 10 is minimized. In addition, the hysteresis curve A is made more nearly symmetrical and the flex lead spring restraints about null are more nearly balanced in gyro 10, whereby the drift errors in gyro 10 are minimized.

Clip 92, 94 preferably are also electrically conductive, so that a part of the current flow between pins 72, 74 passes through lead 90, and the remaining part passes through lead 76. In this way, the thermal reactions from current flow of lead 76 on pin 72 is balanced by the substantially equal and opposite thermal reaction of lead 90 on pin 72. Thus, the operating thermal forces of the lead on the float are balanced and drift error is minimized.

In FIGS. 7–9, an alternate embodiment 10a is shown having a conductor 54a. The parts of FIGS. 7–9 similar to those of FIGS. 1–6 have the same reference numerals with a subscript a added thereto. Alternate conductor 54a has a terminal pin 72a fixedly connected to its float wall (not shown), and a terminal pin 74a, fixedly connected to its casing wall (not shown), and a flex lead 76a interconnecting pins 72a, 74a. Lead 76a also has clips 80a, 82a, respectively connecting to pins 72a, 74a. Conductor 54a also has a spring means 90a, preferably in the form of a redundant flex lead (FIG. 7). Lead 90a has clips 92a, 94a, respectively connected to a support pin 100 on its float wall, and to a support pin 102 on its casing wall. Leads 76a, 90a are preferably made of preshaped, conductive, metal strips of identical construction. Leads 90a, 76a have electrically insulating covers 104, 106, such as insulating oxides formed on the leads, or the like. Leads 90a, 76a are also interconnected structurally at mid-span by a non-conductive connection 108, such as a non-conductive cement bonded to adjacent portions of covers 104, 106. For illustrative purposes the thicknesses of covers 104, 106 in the drawing (FIGS. 7, 8) have been exaggerated.

Leads 90a, 76a also have an axis of symmetry 96a, and are arranged symmetrically about said axis when their float (not shown) is in a null position. Axis 96a extends through its gyro axis (not shown) when its float is in a null position. Pins 72a and 100 also have a path of travel 73a about its gyro axis, which is common to both said pins. Pins 72a, 74a and 100, 102 are in respective planes parallel to each other and parallel to axis 96a, when their gyro is in a null position. With the construction of conductor 54a, the shifting of the mechanical null position of the gyro is reduced, and the unbalance of the flex-lead spring restraints of the gyro is reduced as compared to the prior-art type of conductors, thereby minimizing drift error in such a single-axis gyro according to the invention. In addition, in other sensitive instruments, the alternate arrangement used with conductor 54a may be more convenient for other design purposes.

While the present invention has been described in a preferred embodiment, and also in an alternate embodiment, it will be obvious to those skilled in the art that various modifications can be made therein within the scope of the invention. For example, the conductor according to the invention can be conveniently used with certain types of accelerometers. It is intended that the appended claims cover all such modifications.

What is claimed is:

1. In a single-axis floated gyroscope which includes a casing and a float buoyantly supported in the casing for relative angular displacement about the gyroscope axis in either direction from a null position, flexible electrical conductor means spanning between the float and casing, comprising:

a first terminal disposed on the casing;

a second terminal disposed on the float, radially separated from the casing terminal, coplanar with the casing terminal and gyro output axis when the float is in its null position;

a bent wire with respective end portions fixedly connected to said terminals, and having a clockwise spring rate and a different counter-clockwise spring rate urging the float to its null position; and a spring means with respective end portions fixedly connected adjacent to said terminals, and having a clockwise spring rate identical to the wire counter-clockwise rate, and having a counter-clockwise spring rate identical to the wire clockwise rate, urging the float to its null position, the total clockwise spring rate being identical to the total counter-clockwise spring rate of the wire and spring in combination.

2. A conductor as claimed in claim 1 and in which the spring means is a second bent wire identical in construction to the first-mentioned wire, the two wires being arranged symmetrically about a radial axis of symmetry when the float is in null position.

3. A conductor as claimed in claim 2 and in which each of said wires has two end support clips respectively connecting to said terminal pins.

4. A conductor as claimed in claim 3 in which both clips of at least one of said wires are electrically conductive.

5. A conductor as claimed in claim 3 and in which the two wires are arranged oppositely with respective ends substantially pointing toward each other.

6. A conductor as claimed in claim 1 and in which the spring means is a second bent wire having a non-conductive connection to the first-mentioned wire at an intermediate portion of the first wire located between its end portions.

7. A conductor as claimed in claim 6 and in which the two wires are arranged oppositely and back-to-back with respective ends substantially pointing away from each other.

References Cited
UNITED STATES PATENTS

| | | | |
|---|---|---|---|
| 1,226,882 | 5/1917 | Henderson | 74—5 X |
| 2,859,625 | 11/1958 | Bonnell | 74—5.7 |
| 3,186,239 | 1/1965 | Emmerich | 74—5 |
| 3,240,076 | 3/1965 | Choh Hsien Li | 74—5.7 |

MILTON KAUFMAN, *Primary Examiner.*

PALMER W. SULLIVAN, *Examiner.*

C. J. HUSAR, *Assistant Examiner.*